United States Patent [19]

David

[11] 4,040,642
[45] Aug. 9, 1977

[54] COLLAPSIBLE LUGGAGE CARRIER

[76] Inventor: Melvin J. David, 16221 Quemada Road, Encino, Calif. 91314

[21] Appl. No.: 649,341

[22] Filed: Jan. 15, 1976

[51] Int. Cl.² .......................................... B62B 11/00
[52] U.S. Cl. ................................................ 280/654
[58] Field of Search ............ 280/652, 654, 655, 47.27, 280/47.29, 47.28; 403/109; D12/34

[56] References Cited

U.S. PATENT DOCUMENTS

| 1,441,045 | 1/1923 | Tredwell | 403/109 |
|---|---|---|---|
| 2,225,889 | 12/1940 | Rubenstein | 403/109 |
| 3,041,026 | 6/1962 | Wilson | 280/654 |
| 3,827,707 | 8/1974 | Bierman | 280/654 |
| D. 155,640 | 10/1949 | Stoll | 280/654 |
| D. 200,634 | 3/1965 | Raye | D12/34 |

Primary Examiner—Robert R. Song

[57] ABSTRACT

A collapsible carrier for the movement of luggage or like parcels. A pair of substantially parallel, telescoping members depend perpendicular from an axle and wheel assembly, the telescoping members being joined at the top thereof by a handle. The telescoping members comprise a plurality of consecutively, axially joined sections, the coupling therebetween providing for the concentric storage of each section, each section being of uniformly reduced diameter from the axle to the handle. Each section is frictionally coupled to an adjacent section to provide for variable extension thereof. A support frame for holding the luggage pivots about an axis whereby the frame can lie either in the plane of the telescoping members or lie perpendicular thereto. In the open position, the frame lies perpendicular to the telescoping members and includes means for permitting the carrier to be opened and maintain the frame in a plane which is parallel to the ground.

6 Claims, 8 Drawing Figures

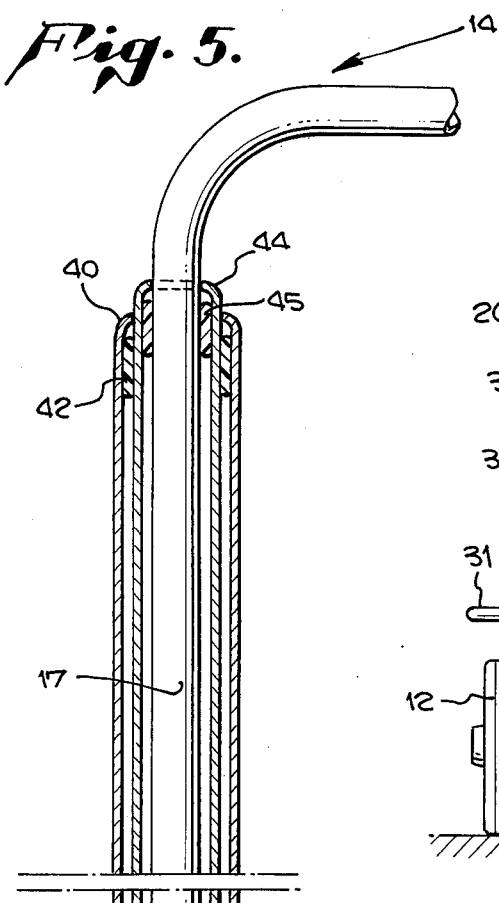
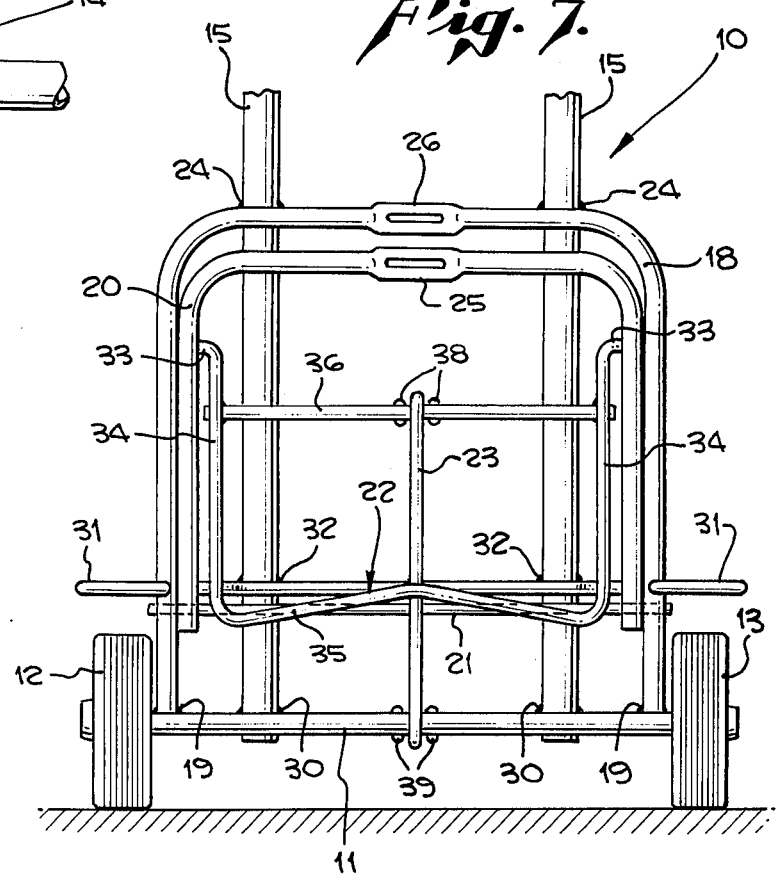
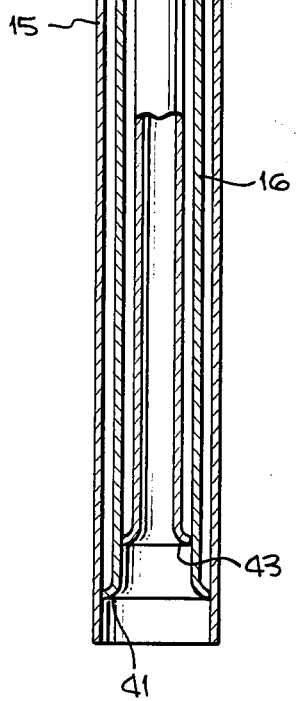
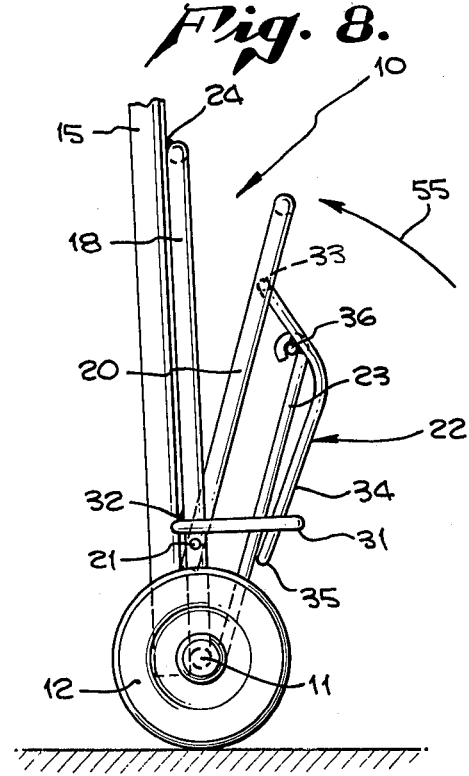

COLLAPSIBLE LUGGAGE CARRIER

BACKGROUND OF THE INVENTION

1. Field of the Invention

The present invention generally relates to cargo carrying devices and more particularly to those devices which are adapted to be carried in confined quarters and be used for moving luggage or related personal items.

2. Prior Art

With the increased mobility of the population both for business and recreational travel, it has become evident that there is a need for improved means for the movement of luggage and related parcels. This is particularly evident where luggage or parcel movement is required by persons traveling on airplanes. In those circumstances where an individual is unable to obtain or does not desire to pay another to carry or otherwise move luggage, he is forced to carry the parcel by hand or use those devices which are described by the prior art.

The typical devices described by the prior art for the personal movement of luggage is the fixed carrier which is illustrated by shopping carts or other like devices. In all cases, the devices disclosed by the prior art are cumbersome and therefore are not capable of being comfortably carried by the passenger from place to place. With respect to those carrying devices which are collapsible, typically the base for supporting the luggage or other parcel is capable of being pivoted about its axis to lie parallel to the plane of the handle or other adjacent support. Even where this capability exists, the devices still maintains its full length. The only feature which provides an advantage to these devices is the ability to reduce the bulk width of the carrier.

In those devices wich provide a collapsible capability, the structure used therewith is totally unsatisfactory. The devices disclosed by the prior art utilize pivoted or scissoring elements in an attempt to reduce the total size of the structure. This procedure has inherent defects. Where the elements of the structure are closed upon one another in a pivoting or scissoring manner, the overall size of the unit is not reduced since the elements of the device are merely displaced into another plane.

The present invention substantially resolves those problems which exist in the carrying devices disclosed by the prior art. The carrying frame of the present invention is permitted to rotate about an axis which is displaced from the rolling axis of the carrier. In its closed position, the carrying frame lies substantially adjacent the supporting members of the carrier and in parallel, spaced relation from the rolling axle of the carrier. In order to fully reduce the size of the carrier in a manner which will facilitate its use, a plurality of telescoping elements are used to form the carrying support. The supporting segments of each member comprising the handle of the carrier lie on a common axis, each element moving upwardly from the axle of the carrier and being reduced in diameter from each succeeding element. The frictional joints coupling each of the adjacent elements permit the carrying support and handle to be closed or opened at will, the elements being firmly positioned in place when open.

SUMMARY OF THE INVENTION

The present invention compises a luggage or parcel carrier which is collapsible in a manner which facilitates personal use by travelers irrespective of their mode of transportation. An axle adapted to receive rollers or wheels at the ends thereof has mounted thereon a pair of telescoping supporting members which are used to brace or otherwise support the luggage or parcels moved by the user. The supporting members are in parallel spaced relation to one another, the supporting members comprising a plurality of sections which vary in diameter. Each of the sections of each supporting member are reduced in diameter from the bottom to the top thereof, each section being adapted to be received within the inner cavity defined by the larger, adjacent section.

A frictional coupling between each of the adjacent sections of each supporting member provides for ease of operation. Each coupling is between a pair of cylindrical sections having common longitudinal axes. The intersection is adapted to be received within the cavity of the larger cylindrical section. At the coupling, the terminus of the larger section is flared inwardly, the diameter of the flared terminus of the larger section approximating the outer diameter of the smaller section. The terminus of the smaller telescoping section flares outwardly within the cavity formed by the larger section and is adapted to slidingly engage the inner surface of the larger section. Intermediate the flared termni of the coupled section is a cylindrical O-ring which provides for a frictional engagement to maintain the position of the coupled section irrespective of whether the sections are fully extended or in the collapsed position.

A parcel support frame is coupled to the support member perpendicular thereto in a manner which places the support frame in parallel, spaced relation to the axle. The parcel support frame is adapted to rotate about its axis in a manner which will permit it to swing through a 90° arc so that it can lie in the same plane as the supporting members when not being used, and be extended perperdicular thereto to form a base for luggage or parcels when such use is necessary. Means for stabilizing the carrying unit is coupled intermediate the supporting frame and axle in a manner which will permit the supporting members to be placed in a vertical position at the time the carrier is being prepared for use.

It is therefore an oabject of the present invention to provide an improved luggage carrier.

It is another object of the present invention to provide an improved luggage carrier which is collapsible.

It is still another object of the present invention to provide a luggage carrier which incorporates a telescoping handle and support which can be maintained in the opened or closed position without the use of complex locking mechanisms.

It is still yet another object of the present invention to provide an improved luggage carrier which is simple and inexpensive to fabricate.

The novel features which are believed to be characteristic of the invention, both as to its organization and method of operation, together with further objectives and advantages thereof, will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

BRIEF DESCRIPTION OF THE DRAWING

FIG. 5 is a cross-sectional view of the extension members of the present invention luggage carrier shown in the fully closed position.

FIG. 6 is a cross-sectional view of another form of coupling to be used between the extension sections of the present invention luggage carrier.

FIG. 7 is a partial fron elevation view of the present invention luggage carrier illustrating a fully closed supporting frame.

FIG. 8 illustrates a side elevation view of the present invention luggage carrier with the extension members fully closed and the supporting frame in a partially closed position.

DESCRIPTION OF THE PRESENTLY PREFERRED EMBODIMENT

Figure 1:
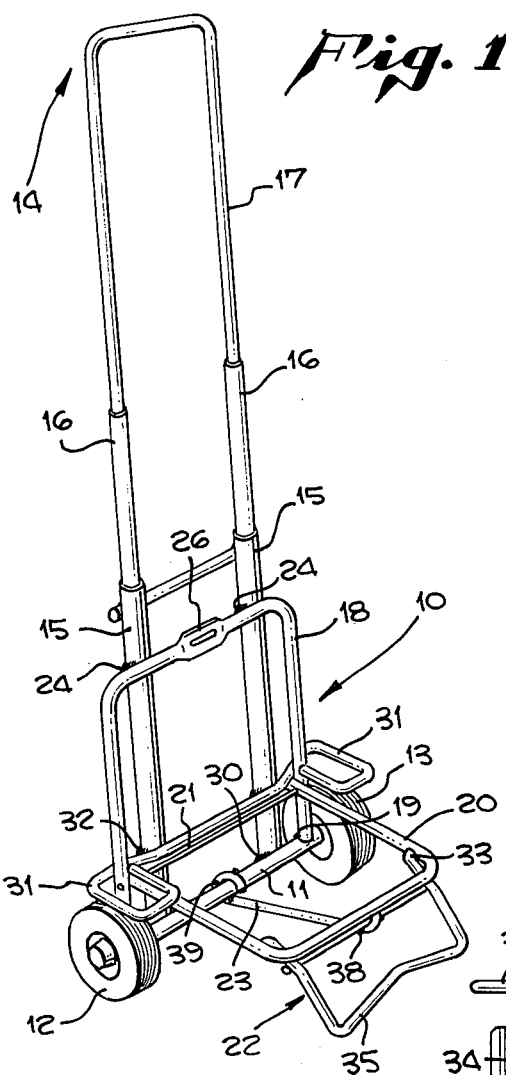
FIG. 1 is a front perspective view of the present invention luggage carrier shown in the fully open position.

An understanding of the present invention can be best gained by reference to FIG. 1 wherein a perspective view of the present invention luggage carrier is shown, the carrier being generally designated by the reference numberal 10. As stated previously, the present invention luggage carrier is to be used to move luggage or other parcels. In this context, axle 11 provides the base for carrier 10, wheels 12 and 13 being journeled about the ends of axle 11 by appropriate bearings. Handle assembly 14 is rigidly coupled to axle 11 and oriented perpendicular thereto. Handle assembly 14 is comprises of a pair of extension members each including a plurality of telescoping extension sections 15, 16 and 17. Although FIG. 1 illustrates the use of only three sets of extension sections 15, 16 and 17, it is within the scope of the present invention to utilize any reasonable number to implement the objectives of the present invention as stated herein. Extension sections 15, 16 and 17 provide a collapsible mode for handle assembly 14, the operation thereof being described in detail hereinbelow.

Carrier base support 18 is disposed coplanar to that formed by handle assembly 14, the ends thereof being rigidly secured to axle 11 by welded joints 19, base support 18 being rigidly secured to extension sections 15 by welded joints 24. Although the preferred form for implementing rigid connections between the elements of the present invention is through the use of conventional welding procedures, it is clear that other securing means can be used.

In order to supply an adequate structure for the carriage of luggage or other parcels, frame 20 is pviotable about suitable points on base support 18. As shown in FIG. 1, pivoting bar 21 is disposed in parallel spaced relation to axle 11 and is secured through respective apertures in base support 18. The termini of frame 20 are coupled about pivoting bar 21 within the confines of base support 18 to provide for movement about pivoting bar 21. This will be explained in detail hereinbelow.

To maintain the present invention carrier in an upright position incident to use thereof, brace 22 is pivotally coupled to frame 20. Structural stability is augmented by placing retention bar 23 intermediate brace 22 and axle 11. The positioning of retention bar 23 in relationship to brace 22 aids in maintaining carrier 10 in the closed position in a maner which will be described in detail hereinbelow.

Figure 2:
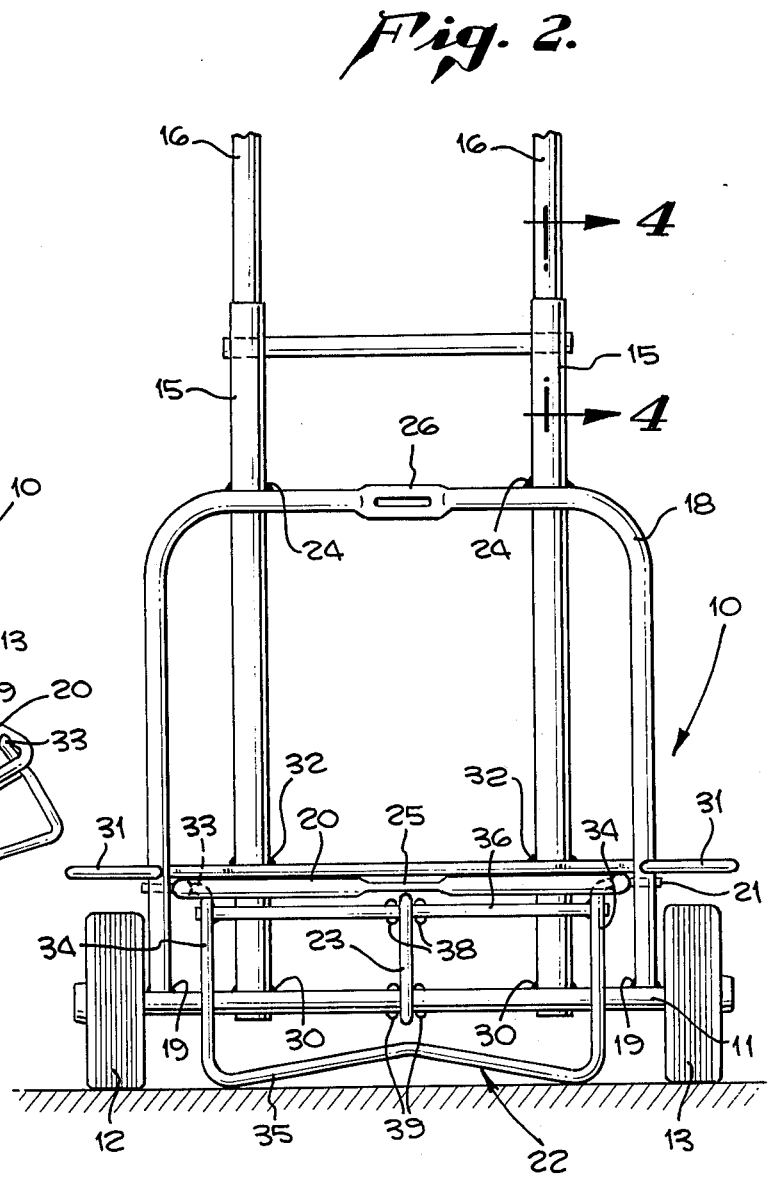
FIG. 2 is a partial front elevation view of the present invention luggage carrier illustrating a fully opened supporting frame.
Figure 3:
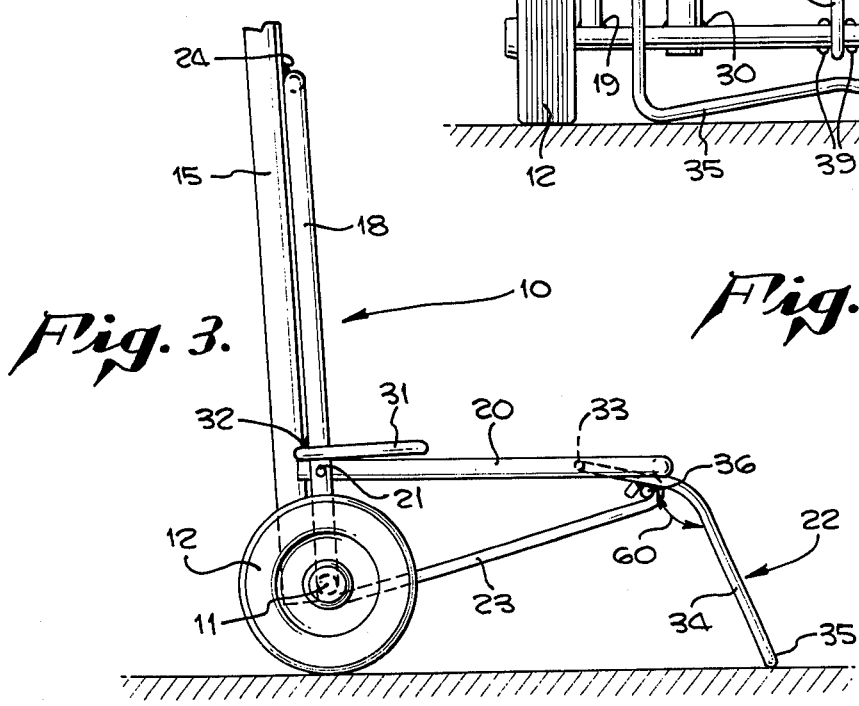
FIG. 3 is a side elevation view of the present invention luggage carrier illustrating the fully opened support frame.

Referring now to FIG. 2 and FIG. 3, the operation of the supporting structure of the present invention can be best seen. FIG. 3 illustrates carrier 10 in the fully opened position as represented by the substantially perpendicular relationship between frame 20 and carrier base support 18. FIG. 2 illustrates a front elevation view of the structure wherein frame 20 has been rotated toward base support 18. Extension section 15 is perpendicular to axle 11, the pair of extension sections 15 being parallel to each other. The assembly of extension sections 15 are uniformly disposed between wheels 12 and 13 and are securely mounted to axle 11 by welded joints 30. As was described previously, carrier base support 18 is secured to extension section 15 and axle 11 by way of welded joints 24 and 19 respectively. As can be best seen in FIG. 2 and FIG. 3, pivoting bar 21 is disposed through the vertical portions of base support 18 and secured thereto in a manner which would prevent pivoting bar 21 from being inadvertently dislodged.

Frame 20 is a substantially U-shaped member, the legs thereof having apertures disposd therethrough for receiving pivoting bar 21. The legs of frame 20 are rotatably mounted about pivoting bar 21 between the vertical portions of base support 18 (FIG. 2). Since the present invention luggage carrier 10 is provided with wheels 12 and 12 for movement thereof, wheel guard 31 is disposed in parallel, spaced relation to pivoting bar 21, As can be best seen in FIG. 3, wheel guard 31 is securely mounted to the vertical portion of carrier base support 18 via welded joints 32. Although wheel guards 31 form a rectangular shield above each wheel 12 and 13, it is clear that the structural shape of wheel guard 31 adjacent wheels 12 and 13 is a matter of choice. Strap guides 25 and 26 are included within frame 20 and base support 18 respectively to provide means for restraining all luggage which is being carried.

In order to permit carrier 10 to stand in the upright position shown in FIG. 1, a pair of apertures 33 are uniformly disposed into the inner portion of the legs of the U-shaped member comprising frame 20. Brace 22 is substantially U-shaped and is comprised of outer legs 34 and the inverted V-shaped stand 35 disposed between legs 34. The upper ends of legs 34 are flared outwardly to form a common axis, the flared ends being disposed within apertures 33 in a manner which would permit brace 22 to rotate about the axis formed between aperture 33 and the portions of leg 34 disposed therein. Arm 36 is secured between legs 34 in the manner shown in FIG. 2. As described previously, in order to permit the present invention luggage carrier to effectively carry parcels, an angle of approximately 90° will be formed between frame 20 and base support 18 when carrier 10 is in the open position (FIG. 3). In order to prevent frame 20 from forming an angle of greater than 90°, the retention arm 23 is positioned intermediate arm 36 and axle 11. Lateral movement of retention arm 37 along arm 36 on axle 11 is precluded by the formation of stops 38 and 39 on arm 36 and axle 11 respectively. As is shown in FIG. 3, clockwise rotation of frame 20 will cease when legs 34 of brace 22 contacts the portion of frame 20 lying perpendicular to legs 34. The abutment of legs 34 and frame 20 in combination with the coupling formed by retention bar 23 will effectively limit the movement of frame 20 to an appropriate position as well as provide the structural rigidity necessary to support a heavy load.

Figure 4:
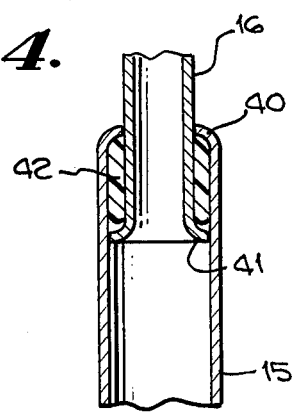
FIG. 4 is a cross-sectional view of a preferred form of the coupling between the telescoping extension sections shown in FIG. 1 taken through line 4—4 of FIG. 1.

As stated previously, an objective of the present invention is to provide a luggage carrier which can be collapsed and opened in a manner will facilitate use by travelers. A preferred from for the frictional coupling intermediate extension sections 15 and 16 can be best seen by reference to FIG. 4. Although described with respect to sections 15 and 16, it is clear that the coupling described is equally applicable to the coupling between extension sections 16 and 17. As stated previously, extension sections 15, 16 and 17 constitute concentric cylinders having uniformly decreased diameters with respect to adjacent sections. As seen in FIG. 4, extension section 15 is adapted to receive extension section 16. End 40 of extension section 15 is flared inwardly to form a circular aperture of substantially the same diameter as the outer diameter of extension section 16. In a like manner, end 41 of extension section 16 is flared outwardly to form a circular flange which is in sliding engagement with the inner surface of extension section 15. Disposd intermediate ends 40 and 41 and between the inner and outer surfaces of extension sections 15 and 16 respectively is cylindrical O-ring 42. The form of O-ring 42 shown in FIG. 4 incorporates an oval cross-section wherein the minor axis thereof is greater than the distance between the inner and outer surfaces of extension sections 15 and 16 respectively. In this manner, the outer and inner surface of O-ring 42 are in frictional engagement with the inner and outer surfaces of extension sections 15 and 16 respectively. The use of an oval profile for O-ring 42 is exemplary only. Any geometrical configuration can be used as long as frictional contact between sections 15 and 16 is assured. The frictional engagement created by O-ring 42 will permit extension sections 16 to move into and out of extension section 15 while allowing section 16 to be placed in any desirable position. An object of the present invention is to provide a luggage carrier 10 with a handle therefor which is adjustable to any desired length. The frictional engagement created by O-ring 42 meets that objective.

Referring now to FIG. 5, a cross-sectional view of a fully collapsed handle assembly 14 is shown. As stated previously, handle assembly 14 comprises telescoping extension sections 15, 16 and 17 which are concentric with one another. In the fully closed position, end 41 of extension section 16 will lie at the lower end of extension section 15. Cylindrical O-ring 42 is frictionally disposed intermediate the inner and outer walls of extension members 15 and 16 respectively. In a like manner, end 43 of extension section 17 is flared outwardly to be in sliding engagement with the inner surface of extension section 16. As with the case described in FIG. 4, end 44 of extension section 16 is flared inwardly to provide a circular aperture which is in sliding engagement with the outer surface of extension section 17. Cylindrical O-ring 45 is disposed intermediate the inner and outer surface of extension sections 16 and 17 respectively. The frictional engagement created by O-ring 45 is identical to that created by O-ring 42. In order to fully collapse handle assembly 14, extension section 17 is forced within extension section 16 and extension section 16, in a like manner, is forced within extension section 15. The frictional engagement created by O-rings 42 and 45 will permit such movement while preventing sections 16 and 17 from sliding unless sufficient force is imposed. As can be seen from FIG. 5, the vertical dimension of the present invention luggage carrier 10 will be substantially reduced when handle assembly 14 is collapsed in the manner shown.

An alternative form for the frictional coupling between the extension sections can be best seen by reference to FIG. 6. As an example, extension sections 50 and 51 are shown, it being understood that these sections are concentric cylindrical members having a structure which are similar to those shown in FIG. 5. In the form of the frictional coupling shown in FIG. 6, end 52 of the extension section 51 is flared outwardly to be in sliding contact with the inner surface of extension section 50. In order to provide for frictional engagement, end 53 of extension section 50 is drawn downwardly until a broad surface thereof is brought into frictional contact with the other surface of extension section 51. The frictional engagement created between the inner surface of end 53 and the outer surface of extension section 51 will provide for a suitable frictional coupling which will satisfy the objectives of the present invention.

An illustration of a fully collapsed version of the present invention luggage carrier 10 can be best seen by reference to FIG. 7. Handle assembly 14 is fully depressed in the manner shown in FIG. 5. When collapsed, extension section 17 will be fully inserted within extension section 16 and in a like manner, extension section 16 will be fully encompassed by extension section 15. In order to place carrier 10 in a convenient form for traveling, frame 20 is closed back upon base support 18 in the manner shown by arrow 55. Since it would be inconvenient if frame 20 would inadvertently open any time force was not exerted thereon, leg 34 of brace 22 is segmented into a pair of portions which are displaced by an angle equal to approximately 120° of arc as illustrated by the reference numeral 60 (FIG. 3). In this manner, when frame 20 is being moved in the direction shown by arrow 55, stand 35 will come into contact with retention arm 37 prior to the full closure thereof. Continued couterclockwise movement of frame 20 will cause stand 35 to bear against retention arm 37 which will in turn impose a force between arm 36 and axle 11. The force created by retention arm 37 will increase the frictional engagement between frame 20 and pivoting bar 21 which will thereby preclude frame 20 from opening without a sufficient clockwise force being imposed thereon.

It can therefore be seen that the present invention luggage carrier 10 provides a device which substantially facilitates use thereof by a traveler. The handle assembly 14 of carrier 10 is opened and closed in a telescoping manner to provide an efficient structure with respect to the size thereof. In addition, the frictional couplings intermediate the extension sections 15, 16 and 17 of handle assembly 14 provide a full range of adjustments in the length thereof so that the open size of the carrier is adjustable to the size of the user. In a like manner, frame 20 upon which the luggage will rest can be closed back upon the handle assembly 14 to minimize the profile and bulk of the carrier. Since the present invention can be constructed of conventional metals which are capable of drawing or otherwise being processed in a manner consistent with that shown in the drawing, the present invention is simple and inexpensive to fabricate.

I claim:
1. Luggage carrying apparatus comprising:
   a. a telescoping handle assembly comprising a pair of extension members in parallel spaced relation to one another, each extension member comprising a plurality of cylindrical extension segments of uniformly graded diameter is axial alignment with one another, said extension segments of each extension member being concentrically mounted whereby the extension segments of each extension member extend and contract along a common axis;
   b. frictional coupling means for coupling each pair of adjacent extension segments of said extension members;
   c. an axle assembly rigidly secured to the termini of said extension members and being perpendicular thereto;
   d. a base support being substantially U-shaped and including first and second legs and integral cross-member therebetween, said cross-member being rigidly secured to said extension members perpendicular thereto, said termini of each of said first and second legs being rigidly secured to said axle assembly;
   e. a support frame being substantially U-shaped and having first and second legs and an integral cross-member therebetween, said termini of the first and second legs of said support frame being pivotally mounted to the first and second legs respectively of said base support;
   f. a brace having first and second legs and a support stand integrally mounted therebetween, the first and second legs of said brace being pivotally mounted between the first and second legs of said support frame in the proximity of the cross-member of said support frame; and
   g. retention means for limiting the rotational movement of said support frame with respect to said support base, said retention means coupled intermediate said frame and said axle.

2. Luggage carrying apparatus as defined in claim 1 wherein said friction coupling means comprises:
   a. a first cylindrical extension segment of a first diameter being flared inwardly at an end thereof;
   b. a second cylindrical extension segment of a second diameter which is smaller than said first diameter, said second extension segment being uniformly flare outwardly, said second extension segment being disposed within said first extension segment, the flared end of said first extension segment being in sliding engagement with the outer surface of said second extension segment, the flared end of said second extension segment being in sliding engagement with the inner surface of said first extension segment whereby a cylindrical cavity is formed intermediate the inner and outer surfaces of said first and second extension segments respectively and the flared ends therof; and
   c. friction means for imposing a frictional force between the inner surface of said first extension segment and the outer surface of said second segment along said cylindrical cavity.

3. Luggage carrying means as defined in claim 2 wherein said friction means is a rubber O-ring disposed within said cylindrical cavity, said O-ring being in engagement with the inner and outer surfaces of said first and second extension segments respectively.

4. Luggage carrying apparatus as defined in claim 1 wherein said friction coupling means comprises:
   a. a first cylindrical extension segment of a given outer diameter, and end thereof being uniformly flared outwardly; and
   b. a second cylindrical extension segment having an inner diameter which is greater than the outer diameter of said first extension segment and substantially equal to the diameter of the flared end of said first extension segment, said second extension segment adapted to axially receive the flared end of said first extension segment therein, the inner diameter of said second extension segment adjacent said first extension segment being drawn down to a reduced diameter, the inner diameter thereof being substantially equal to the outer diameter of said first extension segment and being in frictional engagement therewith.

5. Luggage carrying apparatus as defined in claim 1 wherein the first and second legs of said brace each include first and second segments integral with each other and being displaced by approximately 120° of arc.

6. Luggage carrying apparatus as defined in claim 5 wherein said retention means comprises a retention bar rigidly coupled intermediate respective segments of the first and second legs of said brace adjacent the coupling to said frame, and a retaining arm coupled intermediate said retention bar and said axle.

* * * * *